(12) United States Patent
Law et al.

(10) Patent No.: US 12,212,633 B2
(45) Date of Patent: Jan. 28, 2025

(54) STRING PROCESSING OF CLICKSTREAM DATA

(71) Applicant: Charles Schwab & Co., Inc., San Francisco, CA (US)

(72) Inventors: Sean Ming-Yin Law, Ann Arbor, MI (US); Kenneth Edward Angel, North Richland Hills, TX (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 0 days.

(21) Appl. No.: 18/409,051

(22) Filed: Jan. 10, 2024

(65) Prior Publication Data
US 2024/0146820 A1 May 2, 2024

Related U.S. Application Data

(60) Division of application No. 17/872,444, filed on Jul. 25, 2022, now Pat. No. 11,917,028, which is a
(Continued)

(51) Int. Cl.
*G06F 15/16* (2006.01)
*G06F 16/957* (2019.01)
(Continued)

(52) U.S. Cl.
CPC .......... *H04L 67/535* (2022.05); *G06F 16/957* (2019.01); *H04L 67/02* (2013.01); *H04L 67/146* (2013.01)

(58) Field of Classification Search
CPC ..... H04L 67/02; H04L 67/146; H04L 67/535; G06F 16/957
(Continued)

(56) References Cited

U.S. PATENT DOCUMENTS 6,421,724 B1 7/2002 Nickerson et al.
6,959,286 B2 10/2005 Perkowski
(Continued)

FOREIGN PATENT DOCUMENTS

WO WO-2010/123705 A2 10/2010

OTHER PUBLICATIONS

International Search Report and Written Opinion for PCT Application No. PCT/IB2020/058503; Dated Mar. 25, 2021; 6 Pages.
(Continued)

*Primary Examiner* — Moustafa M Meky
(74) *Attorney, Agent, or Firm* — Harness, Dickey & Pierce, P.L.C.

(57) ABSTRACT

A method includes assigning unique symbols to pages of a website, respectively. The method includes obtaining page symbol sequences of browsing sessions, respectively. Each browsing session corresponds to a visitor of the website. For each browsing session, the page symbol sequence of the browsing session is a sequence of symbols that corresponds, respectively, to a sequence of pages of the website visited during the browsing session by the corresponding visitor. The method includes generating a master string including the page symbol sequences, generating a suffix array corresponding to the master string, and generating a longest common prefix (LCP) array corresponding to the suffix array. The method includes, based on the suffix array and LCP array, determining one or more most common n-step subsequences of pages (n is an integer greater than 1).

20 Claims, 9 Drawing Sheets

Related U.S. Application Data continuation of application No. 17/202,847, filed on Mar. 16, 2021, now Pat. No. 11,438,428, which is a continuation of application No. 16/917,678, filed on Jun. 30, 2020, now Pat. No. 10,986,200.

(51) Int. Cl.
*H04L 67/02* (2022.01)
*H04L 67/146* (2022.01)
*H04L 67/50* (2022.01)

(58) Field of Classification Search
USPC .......................................................... 709/224
See application file for complete search history.

(56) References Cited

U.S. PATENT DOCUMENTS

| | | | |
|---|---|---|---|
| 6,996,536 B1 | 2/2006 | Cofino et al. | |
| 7,877,691 B2 | 1/2011 | Goering et al. | |
| 7,970,887 B2 | 6/2011 | Nickerson et al. | |
| 8,069,407 B1* | 11/2011 | Armandpour | G06F 11/3672 |
| | | | 714/39 |
| 8,095,530 B1 | 1/2012 | Lloyd | |
| 8,290,973 B2 | 10/2012 | Flake et al. | |
| 8,346,920 B2 | 1/2013 | Rothschild | |
| 8,600,968 B2 | 12/2013 | Holenstein et al. | |
| 8,955,739 B2 | 2/2015 | Cameron et al. | |
| 9,292,615 B2* | 3/2016 | Seifert | G06F 16/958 |
| 9,400,844 B2 | 7/2016 | Zohar et al. | |
| 10,885,576 B2* | 1/2021 | Deo | G06Q 30/0633 |
| 10,986,200 B1 | 4/2021 | Law et al. | |
| 11,288,732 B2* | 3/2022 | Deo | G06Q 30/0633 |
| 11,373,103 B2 | 6/2022 | Jain et al. | |
| 11,438,428 B2 | 9/2022 | Law et al. | |
| 2002/0112035 A1 | 8/2002 | Carey et al. | |
| 2005/0182677 A1 | 8/2005 | Hill | |
| 2006/0172273 A1 | 8/2006 | Heffernan et al. | |
| 2006/0230343 A1* | 10/2006 | Armandpour | G06F 16/958 |
| | | | 707/E17.116 |
| 2008/0270473 A1 | 10/2008 | Flake et al. | |
| 2008/0270620 A1 | 10/2008 | Flake et al. | |
| 2009/0298037 A1 | 12/2009 | Heffernan et al. | |
| 2010/0082637 A1 | 4/2010 | Mishne et al. | |
| 2010/0318374 A1 | 12/2010 | Flake et al. | |
| 2012/0016980 A1 | 1/2012 | Rothschild | |
| 2012/0016991 A1 | 1/2012 | Rothschild | |
| 2012/0042237 A1* | 2/2012 | Armandpour | G06F 21/41 |
| | | | 715/234 |
| 2012/0271805 A1 | 10/2012 | Holenstein et al. | |
| 2012/0331128 A1* | 12/2012 | Seifert | G06F 16/958 |
| | | | 709/224 |
| 2013/0103793 A1 | 4/2013 | Rothschild | |
| 2013/0200145 A1 | 8/2013 | Cameron et al. | |
| 2015/0025953 A1 | 1/2015 | Flake et al. | |
| 2015/0269609 A1 | 9/2015 | Mehanian et al. | |
| 2017/0244796 A1 | 8/2017 | Liu et al. | |
| 2017/0270416 A1 | 9/2017 | Sri et al. | |
| 2019/0205971 A1* | 7/2019 | Deo | H04L 67/535 |
| 2020/0134511 A1 | 4/2020 | Ho et al. | |
| 2020/0380376 A1 | 12/2020 | Jain et al. | |
| 2021/0209675 A1* | 7/2021 | Deo | G06Q 30/0641 |
| 2022/0253922 A1* | 8/2022 | Deo | G06F 16/951 |

OTHER PUBLICATIONS

International Preliminary Report on Patentability Corresponding to International Application No. PCT/IB2020/058503. dated Dec. 13, 2022.

* cited by examiner

| Suffix Array (701) | LCP Array (801) | String (601) |
|---|---|---|
| 23 | 1 | $ |
| 13 | 1 | $A$BANDANA$ |
| 9 | 1 | $AND$A$BANDANA$ |
| 2 | 1 | $BANANA$AND$A$BANDANA$ |
| 15 | 0 | $BANDANA$ |
| 22 | 2 | A$ |
| 8 | 2 | A$AND$A$BANDANA$ |
| 1 | 2 | A$BANANA$AND$A$BANDANA$ |
| 14 | 1 | A$BANDANA$ |
| 20 | 4 | ANA$ |
| 6 | 3 | ANA$AND$A$BANDANA$ |
| 4 | 2 | ANANA$AND$A$BANDANA$ |
| 10 | 3 | AND$A$BANDANA$ |
| 17 | 0 | ANDANA$ |
| 3 | 3 | BANANA$AND$A$BANDANA$ |
| 16 | 0 | BANDANA$ |
| 12 | 1 | D$A$BANDANA$ |
| 19 | 0 | DANA$ |
| 21 | 3 | NA$ |
| 7 | 2 | NA$AND$A$BANDANA$ |
| 5 | 1 | NANA$AND$A$BANDANA$ |
| 11 | 2 | ND$A$BANDANA$ |
| 18 | 0 | NDANA$ |

Data Set

Dataset | 1

Settings

Min Length  ▭━━━━━ 2

Max Length  ━━━━━▭ 10

First Step  [         ]

Last Step   [         ]

Min Complexity ▭━━━━ 2

Hide Loops  ☑

[ Update ]

*FIG. 9*

STRING PROCESSING OF CLICKSTREAM DATA

CROSS-REFERENCE TO RELATED APPLICATIONS

This application is a divisional of U.S. patent application Ser. No. 17/872,444, filed Jul. 25, 2022, which is a continuation of U.S. patent application Ser. No. 17/202,847, filed Mar. 16, 2021, which is a continuation of U.S. patent application Ser. No. 16/917,678, filed Jun. 30, 2020, the entire disclosure of each of which is incorporated herein by reference.

FIELD

The present disclosure relates to large-scale data processing and more particularly to applying string processing to clickstream data.

BACKGROUND

Businesses that have web sites may observe the behavior of visitors who are visiting those web sites in order to collect behavior data, and analyze the behavior data in order to gain insights about the users' experiences on the website and characteristics of the users themselves. Businesses can use such insights to, for example, change various aspects of their websites or other areas of their business. However, as the size of a website, the number of users, and/or the complexity of the user behavior being observed increases, a total amount of behavior data a business collects may become substantially large, and thus, difficult to analyze efficiently.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to at least some example embodiments, a method includes assigning a plurality of unique symbols to a plurality of pages of a website, respectively; obtaining a plurality of page symbol sequences of a plurality of browsing sessions, respectively; each browsing session corresponding to a visitor of the website, for each browsing session, the page symbol sequence of the browsing session being a sequence of symbols, from among the plurality of unique symbols, that corresponds, respectively, to a sequence of pages of the website visited during the browsing session by the corresponding visitor; generating a master string including the plurality of page symbol sequences; generating a suffix array corresponding to the master string; generating a longest common prefix (LCP) array corresponding to the suffix array; and based on the suffix array and LCP array, determining one or more most common n-step subsequences of pages from among the sequences of pages of the website visited during the plurality of browsing sessions by the visitors to which the plurality of browsing sessions correspond, n being an integer greater than 1.

The method may further include monitoring the plurality of browsing sessions, wherein the monitoring includes obtaining the sequence of pages of the website visited during the browsing session by the corresponding visitor.

The master string may include concatenating the plurality of page symbol sequences and a plurality of sentinel symbols together such that at least one sentinel symbol exists between each consecutive pair of page symbol sequences in the master string.

The method may further include defining a plurality of suffixes of the master string, wherein each suffix is a substring of the master string and wherein the defining the plurality of suffixes includes assigning indexes to symbols included in the master string, respectively and for each assigned index, defining a suffix corresponding to the assigned index.

For each index, from among the assigned indexes, the suffix corresponding to the index may be a substring including the symbol of the master string to which the index is assigned and the symbols of the master string to which any subsequent indexes, from among the assigned indexes, are assigned.

The generating of the suffix array may include arranging the plurality of suffixes lexicographically and generating, as the suffix array, an array storing the assigned indexes in a same order as the suffixes, from among the lexicographically arranged plurality of suffixes that correspond to the assigned indexes, respectively.

The generating of the LCP array may include generating the LCP array such that the LCP array stores, for each consecutive pair of indexes from among the assigned indexes stored in the suffix array, a corresponding LCP value, wherein, for each consecutive pair of indexes from among the assigned indexes stored in the suffix array, the corresponding LCP value in the LCP array indicates a size of an LCP of the consecutive pair of suffixes, from among the lexicographically arranged plurality of suffixes, that correspond to the consecutive pair of indexes.

Each LCP value in the LCP array may be a total number of symbols included in the consecutive pair of suffixes that correspond to the consecutive pair of indexes to which the LCP value corresponds.

The determining of the one or more most common n-step subsequences of pages may include identifying, from among the LCP values stored in the LCP array, one or more consecutive runs of LCP values that are equal to or greater than n; for each identified consecutive run of LCP values, determining a total number of LCP values in the identified consecutive run of LCP values; determining, as one or more top consecutive runs of LCP values, one or more consecutive runs of LCP values, from among the identified consecutive runs of LCP values, having the highest total numbers of LCP values; and identifying, as the one or more most common n-step subsequences, one or more n-step subsequences corresponding, respectively, to the one or more top consecutive runs of LCP values.

For each of the top consecutive run of LCP values, the n-step subsequence corresponding to the top consecutive run of LCP values may be a first n symbols held in common by the consecutive pairs of suffixes that correspond to the consecutive pairs of indexes to which the LCP values in the top consecutive run of LCP values correspond.

According to at least some example embodiments, a computer system includes memory storing computer-executable instructions and a processor configured to execute the computer-executable instructions. Further, the computer-executable instructions include assigning a plurality of unique symbols to a plurality of pages of a website, respectively, obtaining a plurality of page symbol sequences of a plurality of browsing sessions, respectively, each browsing session corresponding to a visitor of the website, for each browsing session, the page symbol sequence of the browsing session being a sequence of symbols, from among the plurality of unique symbols, that corresponds, respectively, to a sequence of pages of the website visited during the browsing session by the corresponding visitor, generating a master string including the plurality of page symbol sequences, generating a suffix array corresponding to the master string, generating a longest common prefix (LCP) array corresponding to the suffix array, and based on the suffix array and LCP array, determining one or more most common n-step subsequences of pages from among the sequences of pages of the website visited during the plurality of browsing sessions by the visitors to which the plurality of browsing sessions correspond, n being an integer greater than 1.

The computer-executable instructions may include monitoring the plurality of browsing sessions and the monitoring may include obtaining the sequence of pages of the website visited during the browsing session by the corresponding visitor.

The generating of the master string may include concatenating the plurality of page symbol sequences and a plurality of sentinel symbols together such that at least one sentinel symbol exists between each consecutive pair of page symbol sequences in the master string.

The computer-executable instructions may include defining a plurality of suffixes of the master string, each suffix may be a substring of the master string, and the defining the plurality of suffixes may include assigning indexes to symbols included in the master string, respectively and for each assigned index, defining a suffix corresponding to the assigned index.

For each index, from among the assigned indexes, the suffix corresponding to the index may be a substring that includes the symbol of the master string to which the index is assigned and the symbols of the master string to which any subsequent indexes, from among the assigned indexes, are assigned.

Generating the suffix array may include arranging the plurality of suffixes lexicographically and generating, as the suffix array, an array storing the assigned indexes in a same order as the suffixes, from among the lexicographically arranged plurality of suffixes, that correspond to the assigned indexes, respectively.

Generating the LCP array may include generating the LCP array such that the LCP array stores, for each consecutive pair of indexes from among the assigned indexes stored in the suffix array, a corresponding LCP value and for each consecutive pair of indexes from among the assigned indexes stored in the suffix array, the corresponding LCP value in the LCP array may indicate a size of an LCP of the consecutive pair of suffixes, from among the lexicographically arranged plurality of suffixes, that correspond to the consecutive pair of indexes.

Each LCP value in the LCP array may be a total number of symbols included in the consecutive pair of suffixes that correspond to the consecutive pair of indexes to which the LCP value corresponds.

Determining the one or more most common n-step subsequences of pages may include identifying, from among the LCP values stored in the LCP array, one or more consecutive runs of LCP values that are equal to or greater than n, for each identified consecutive run of LCP values, determining a total number of LCP values in the identified consecutive run of LCP values, determining, as one or more top consecutive runs of LCP values, one or more consecutive runs of LCP values, from among the identified consecutive runs of LCP values, having the highest total numbers of LCP values, and identifying, as the one or more most common n-step subsequences, one or more n-step subsequences corresponding, respectively, to the one or more top consecutive runs of LCP values.

For each of the top consecutive run of LCP values, the n-step subsequence corresponding to the top consecutive run of LCP values may be a first n symbols held in common by the consecutive pairs of suffixes that correspond to the consecutive pairs of indexes to which the LCP values in the top consecutive run of LCP values correspond.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 5A illustrates an example of a master string according to principles of the present disclosure.

FIG. 5B illustrates an example of suffixes of a master string according to principles of the present disclosure.

FIG. 6 illustrates an example of lexicographically arranged suffixes of a master string according to principles of the present disclosure.

FIG. 7 illustrates an example of a suffix array of a master string according to principles of the present disclosure.

FIG. 8 illustrates an example of a longest common prefix (LCP) array according to principles of the present disclosure.

FIG. 9 illustrates an example clickstream data visualization calibration interface.

In the drawings, reference numbers may be reused to identify similar and/or identical elements.

DETAILED DESCRIPTION

When users browse a website, patterns may emerge across the users. For example, it may be seen that a subset of users ending up at a "Contact Us" page have previously been through the same series of pages prior to the "Contact Us" page. Identifying these patterns may allow a developer to redesign the website to allow users to more quickly reach the "Contact Us" page. Or, the developer may redesign the website to facilitate at least some of those users achieving their goal without having to resort to the "Contact Us" page. Data indicating a series of clicks made by a user browsing a website may be referred to as clickstream data.

Existing providers can analyze clickstream data included in web logs and provide insights about website interactions. However, this process is very manual and therefore creates a significant delay. Further, as is discussed below with reference to FIGS. 2A and 2B, some conventional methods for analyzing clickstream data rely on Markovian analysis techniques which can limit the depth and explanatory power of clickstream data analysis, thus resulting in analysis results that are less useful to website developers in terms of identifying opportunities to improve the website under analysis.

Figure 2A:
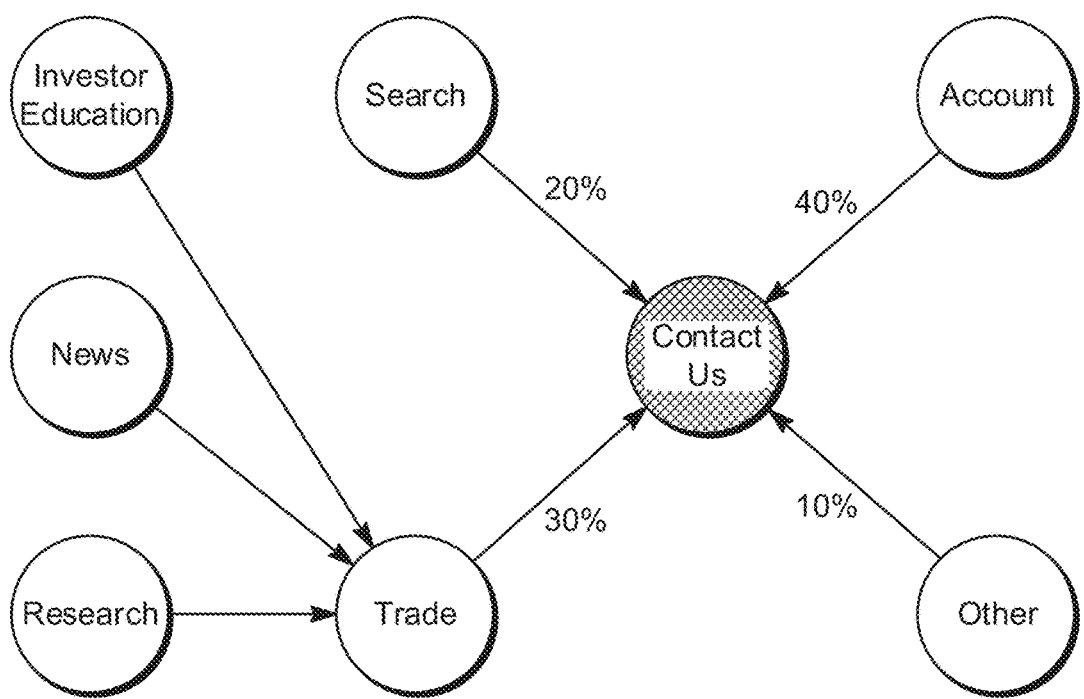
FIGS. 2A and 2B are diagrams for explaining an example Markovian technique for analyzing clickstream data.
Figure 2B:
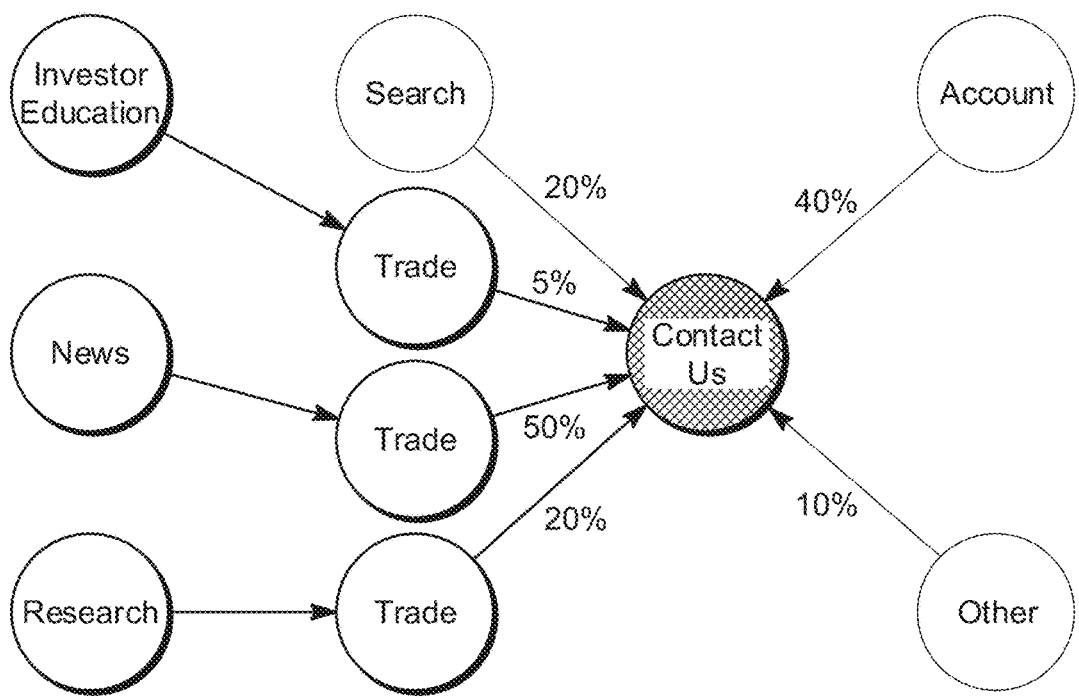

FIGS. 2A and 2B are diagrams for explaining an example Markovian technique for analyzing clickstream data. FIG. 2A illustrates an example of analyzing the clickstream data of several users who ultimately end up on the "Contact Us" page, where the clickstream data is viewed, for example, as a 1st order Markovian process. In the example illustrated in FIG. 2A, an analysis of the clickstream data as a 1st order Markovian process indicates that the probabilities of the next page being the "Contact Us" page when the current page is each one of the "Trade," "Search," "Account" and "Other" pages are as follows: "Trade" page-30%; "Search" page—20%; "Account" page—40%; and "Other" page—10%. As is illustrated in FIG. 2A, in a 1st order Markovian process, the probability of a next state is viewed as being based only on a current state, and not past states.

FIG. 2B illustrates clickstream data of users that arrive at the "Contact Us" page from the "Trade" page in greater detail. As is illustrated in FIG. 2B, 50% of the time, users who arrive at the "Contact Us" page from the "Trade" page arrived at the Trade page from the "News" page, thus indicating a potential issue that is specific to users who travel to the "Trade" page from the "News" page.

Accordingly, if the clickstream data is simply viewed as a 1st order Markovian process, such as is shown in FIG. 2A, a web site developer may be led to believe that there is a potential issue with the "Trade" page that causes users to visit the "Contact Us" page, since almost a third of the users who visit the "trade" page visit the "Contact Us" page next. However, as is illustrated in FIG. 2B, the reasons for users visiting the "Contact Us" page after the "Trade" page may be more complex. For example, a primary driver for users visiting the "Contact Us" page after the "Trade" page may be a particular interrelationship between the "News" page and the "Trade" page as is illustrated in FIG. 2B. However, a web designer may not become aware of the aforementioned interrelationship between the "News" page and the "Trade" page with respect to users who visit the "Contact Us" page from the "Trade" page, if the clickstream data is viewed as a 1st order Markovian process.

It should be noted that it is possible to view the clickstream data as an nth order Markovian process by redefining the state space as including n-page states. For example, in a 2nd order Markovian process, each state would have 2 pages (e.g., [("Trade" page→"Search" page); ("Trade" page→"Account" page); ("Trade" page→"Other" page); ("Trade" page→"Contact Us" page); ("Search" page→"Trade" page); ("Search" page→"Account" page); . . . etc.]). However, as the order number of a Markovian process associated with analysis of clickstream data increases, the size of the state space that is used to analyze the clickstream data increases exponentially, thus increasing the time and processing resources needed to analyze the clickstream data. The rate of increase in the size of the state space is even more pronounced if a total number of pages or potential clicks is large. Accordingly, Markovian processes beyond 2nd or 3rd order Markovian processes are rarely used in clickstream data analysis.

As will be discussed below, according to at least some example embodiments, by using string processing techniques such as suffix arrays, the clickstream data may be analyzed in a manner that does not rely on simply viewing the clickstream data as a Markovian process. Accordingly, an amount of time, processing resources and storage required to perform complex analysis of clickstream data corresponding to potentially large numbers of web pages may be significantly reduced according to at least some example embodiments. Consequently, a website developer may have the ability to find, and thus, address, patterns in the clickstream data that are greater than 2 or 3 pages (or clicks) long. Thus, efforts taken by a web designer to increase the quality of the overall browsing experience of users of the company website by reducing the number of instances in which a user feels the need to visit the "Contact Us" page may be more effective.

The present application describes one or more example embodiments for applying string processing techniques to web log data to identify complex website interaction patterns in clickstream data. Leveraging the extensive research on string processing allows the present disclosure to achieve processing efficiency and space efficiency over all prior analysis systems. Further, the present application describes one or more example embodiments of a method of analyzing clickstream data that does not rely upon viewing the clickstream data as a Markovian process, thus allowing for the identification of more complex patterns within the clickstream data and the development of more effective techniques for improving users' website browsing experiences.

To analyze a website using string processing, a unique symbol from an alphabet can be assigned to each page of the website. While the English alphabet has 26 symbols (or, letters), the string processing techniques in the present disclosure are not limited to an English alphabet. Therefore, the size of the alphabet can be set according to how many discrete pages are present in the website. In some cases, each symbol is an n-bit digital value, where n is chosen such that 2n is greater than the number of pages.

A user's interaction with a website may be described as a sequence of pages that they visit on the website. For the string processing analysis, the beginning and ending of a sequence may correspond to the beginning and ending of a session as understood by the web server that hosts the website. In various other implementations, the sequence may correspond to the beginning and ending of a transmission control protocol (TCP) session between the user and the web server. In various other implementations, the end of the sequence may be defined as the last page loaded prior to a defined period of inactivity. That defined period may be configurable: in one example, 30 minutes.

For each sequence, the pages visited can be mapped to a sequence of alphabet symbols. Now, each sequence is a sentence of alphabet symbols and is ready for analysis by string processing.

Figure 1:
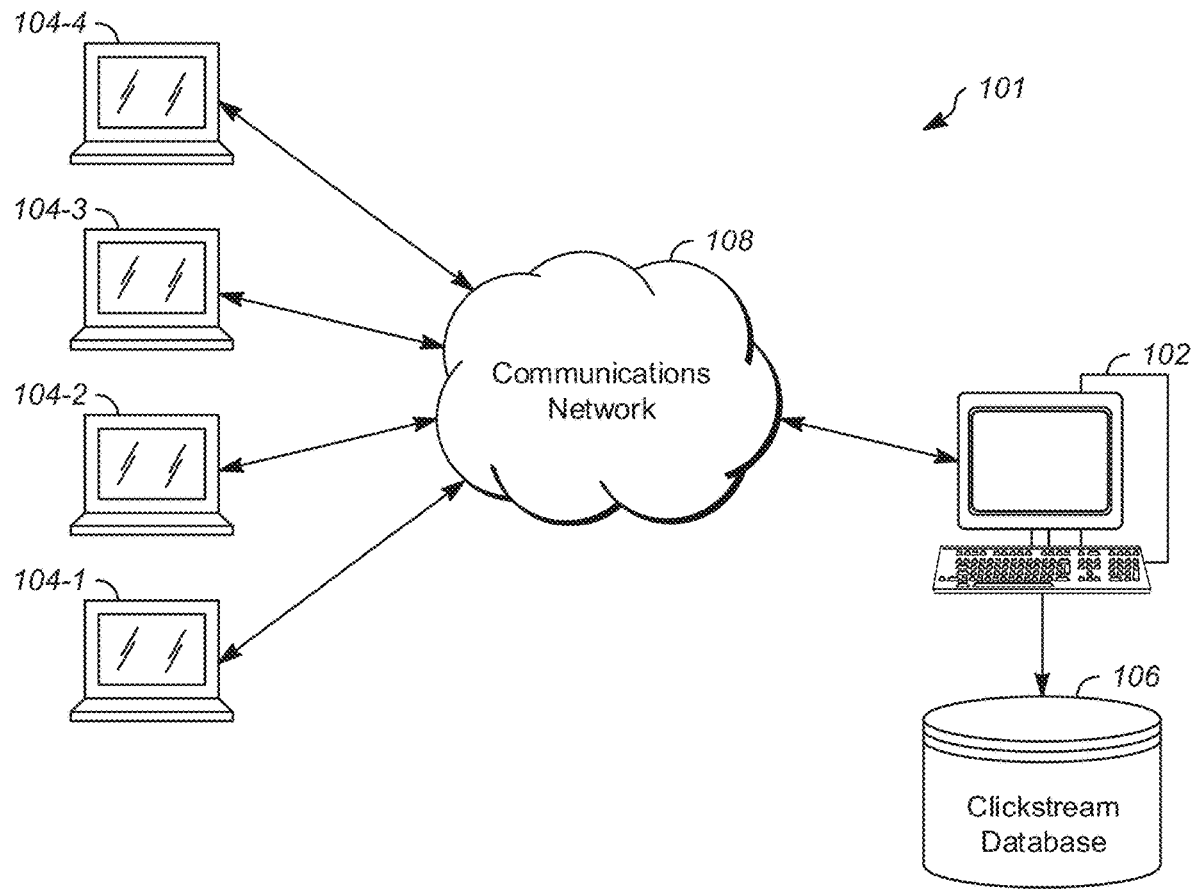
FIG. 1 illustrates a clickstream data analysis system according to principles of the present disclosure.

FIG. 1 illustrates a clickstream data analysis system 101. The clickstream data analysis system 101 may include a clickstream data analysis device 102, user devices 104 including first through fourth user devices 104-1-104-4, and a clickstream database 106. The clickstream data analysis device 102 and the user devices 104 are capable of performing wired and/or wireless communications with each other via communications network 108. The communications network 108 may be any network capable of transmitting electronic data. Examples of the communications network 108 include, but are not limited to, a wireless communications network such as a cellular network or a WiFi network, a local area network (LAN), and the Internet.

According to at least one example embodiment, the clickstream data analysis device 102 may include or be implemented by one or more circuits or circuitry (e.g., hardware) specifically structured to carry out and/or control some or all of the operations described in the present disclosure as being performed by the clickstream data analysis device 102 (or an element thereof). According to at least one example embodiment, the clickstream data analysis device 102 may include or be implemented by a memory and one or more processors executing computer-readable code (e.g., software and/or firmware) that is stored in the memory and includes instructions for causing the one or more processors to carry out and/or control some or all of the operations described in the present disclosure as being performed by the clickstream data analysis device 102 (or an element thereof). According to at least one example embodiment, the clickstream data analysis device 102 may be implemented by, for example, a combination of the above-referenced hardware and one or more processors executing computer-readable code.

The clickstream data analysis device 102 may be, for example a desktop computer or a server. Each of the user devices 104 may each be, any one of, for example, a laptop, a desktop computer, a smart phone, a tablet, a personal digital assistant, and a wearable device.

According to at least one example embodiment, the user devices 104 may each be devices that are accessing a company web site associated with the clickstream data analysis device 102. Further, the clickstream data analysis device 102 is capable of determining which pages of the website each visitor of the website visits, and an order in which each visitor visits pages of the website. The term visitor may refer to a user device that accesses at least one page of the company website or a user of such a user device. As an example, if the first user device 104-1 visits multiple pages of the company website in a certain sequence, during a browsing session, the clickstream data analysis device 102 may obtain the sequence of pages visited by the user device 104-1 during the browsing session and store an indication of the sequence of pages visited by the user device 104-1 in the clickstream database 106. In various implementations, a browsing session is a period during which a visitor is continuously accessing pages of the company website. For example, a browsing session may be a period during which a user is continuously clicking, via a user device of the user, on links of pages of the company website and does not cease the continuous clicking for more than a threshold amount of time (e.g., 30 minutes).

Accordingly, the clickstream data analysis device 102 is capable of storing clickstream data representing several sequences of pages visited during browsing sessions of large numbers of visitors of the company site. Further, as is discussed in greater detail below with reference to FIG. 3, in various implementations, the clickstream data analysis device 102 is capable of leveraging string processing techniques, such as employing suffix arrays and longest common prefix (LCP) arrays, in order facilitate analysis of immense amounts of clickstream data in a manner that is efficient in terms of storage space, data processing resources, and data processing time.

Figure 3:
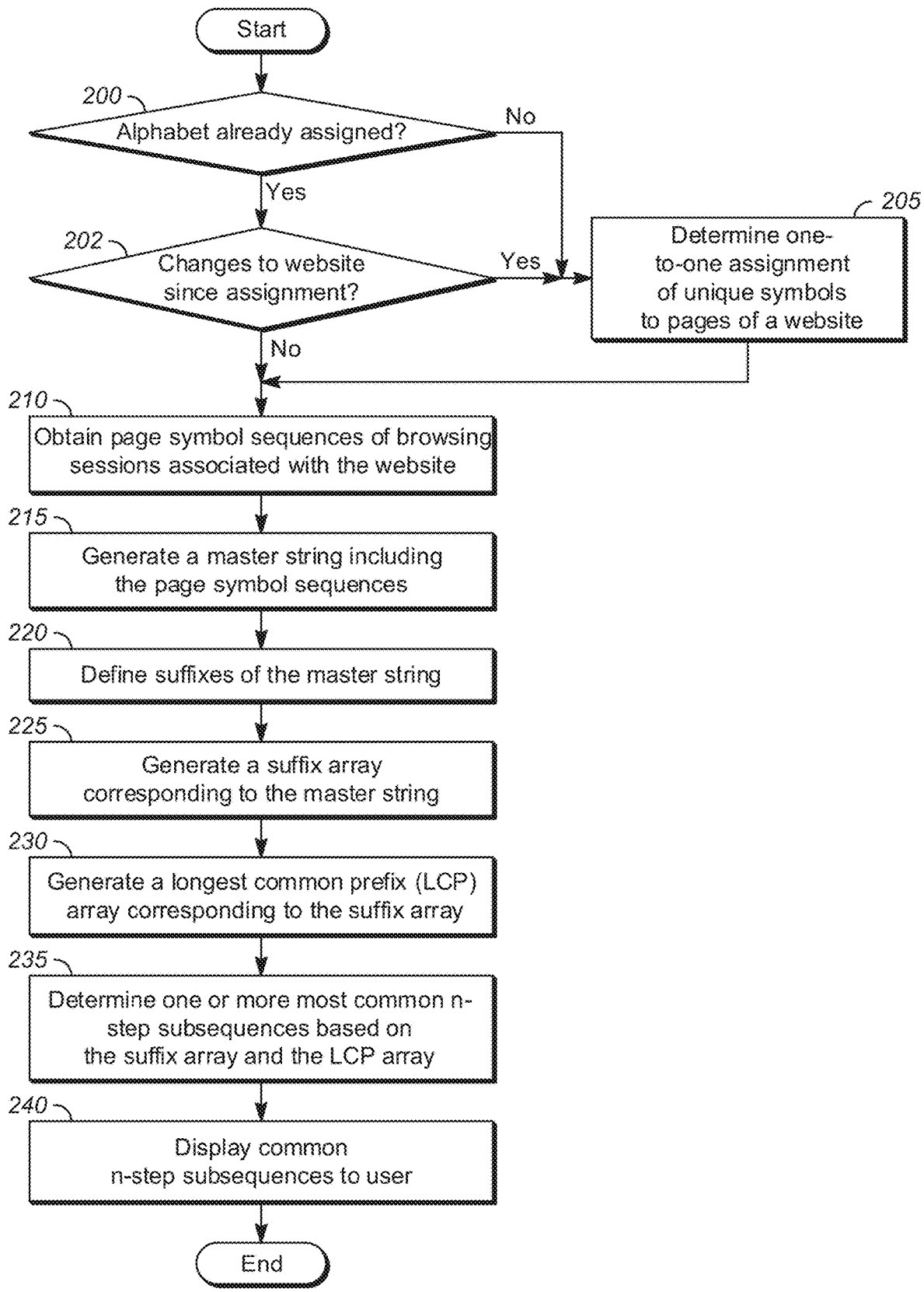
FIG. 3 is a flowchart illustrating a method of applying string processing to clickstream data according to principles of the present disclosure.

FIG. 3 is a flowchart illustrating a method of applying string processing to clickstream data. Referring to FIG. 3, in step 205, the clickstream data analysis device 102 assigns unique symbols to pages of a website. Though, for the purpose of simplicity, the clickstream data analysis device 102 is referred to as assigning unique symbols to pages of a website, according to at least some example embodiments, the unique symbols are applied to unique potential clicks. As used in the present specification, a potential click refers to an action a user can take on a current page of a website, or an element of the current page that user can select, that would cause the user to travel from the current page (i.e., a page currently being visited by the user) to a next page of the website if asserted (i.e., if the act is performed or the element is selected).

A potential click that has been asserted may be referred to in the present specification as an asserted click. For example, when a user asserts a potential click by, for example, selecting a link of a current page, then the potential click becomes an asserted click and the user travels to a next page. A page to which a potential click would cause a user to travel if asserted (e.g., the "next page" discussed above) may be referred to in the present specification as a target page of the potential click or a page to which the click points. A page from which a potential click would cause a user to travel if asserted (e.g., the "current page" discussed above) may be referred to in the present specification as an origin page of the potential click or a page upon which the potential click is located. Further, it is also possible for the current page and the next page to be the same page. For example, it is possible for a potential click to point to its own origin page such that asserting the potential click would cause a user to travel back to the same current page (e.g., clicking a link on the current page that causes the current page to reload).

Examples of potential clicks include, but are not limited to, a text link of the current page, a picture link of the current page, an item in a dropdown menu on the current page, a button on the current page, the act of moving a mouse cursor over and/or through a particular region of the current page, and the act of making a particular gesture with the mouse cursor. According to at least some example embodiments, a potential click could be any method of a user interacting with a current page that, if performed, would cause the user to visit a next page or any element of a current page that, if selected by a user, would cause the user to visit a next page. Examples of visiting the next page or traveling from a current page to a next page include, but are not limited to: replacing the current page with the next page in an existing browser window; and opening a new browser window to display the next page with or without closing an existing browser window that displays the current page.

Further, while multiple potential clicks on a current page can point to the same next page, not all of the potential clicks that point to the same next page would necessarily be the same type of potential click. For example, potential clicks that point to the same next page while being located in different positions on the current page and/or having different forms may be considered different types of potential clicks. For example, according to at least some example embodiments, a text link, a picture link, an entry in a drop down menu, a selectable button, and the act of making a particular gesture with the mouse cursor are examples of different forms (and thus, different types) of potential clicks. Thus, according to at least some example embodiments, even different types of potential clicks on a page which all lead to the same next page may be assigned respectively unique symbols by the clickstream data analysis device 102.

In various implementations, the assignment of unique symbols to each page of a web site (and/or the assignment of unique symbols to each potential click on each page of the web site) is one-to-one.

In various implementations, the clickstream data analysis device 102 may generate a page alphabet in step 205. According to at least some example embodiments, the page alphabet may include a unique symbol for each page the traffic of which an operator of the company website and/or the clickstream data analysis device 102 wishes to analyze, from among the pages of the company website. For example, the page alphabet may include a unique symbol for all the pages in the website or for only a subset of pages that includes less than all the pages of the website.

In addition to, or as an alternative to, generating the aforementioned page alphabet in step 205, in various implementations, the clickstream data analysis device 102 may generate a potential click alphabet in step 205. According to at least some example embodiments, the potential click alphabet may include a unique symbol for each potential click on each page the traffic of which an operator of the company website and/or the clickstream data analysis device 102 wishes to analyze, from among the pages of the company website. For example, the potential click alphabet may include a unique symbol for all potential clicks located on all the pages in the website, or for only a subset of the potential clicks from among the potential clicks located on the pages of the website.

Though, for the purpose of simplicity, the method of FIG. 3 will be described primarily with reference to a page alphabet and symbols of the page alphabet, all operations described with respect to a page alphabet and/or symbols of a page alphabet may also be applied to a potential click alphabet and/or symbols of a potential click alphabet.

Figure 4A:
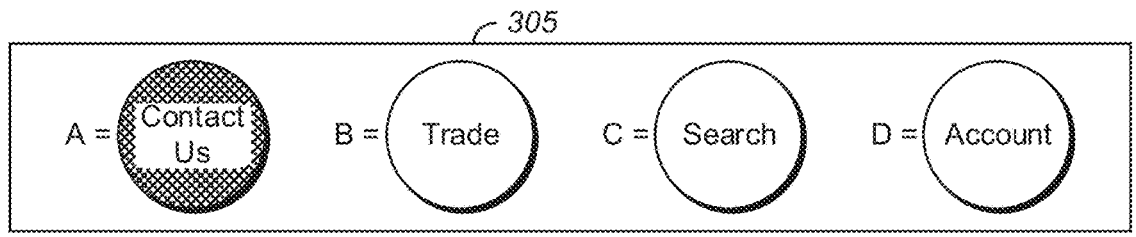
FIGS. 4A-4D are illustrations of a page alphabet according to principles of the present disclosure.

FIGS. 4A-4D are diagrams for explaining a page alphabet according to principles of the present disclosure. FIG. 4A illustrates an example mapping 305 between "contact us," "trade," "search," and "account" pages of the company website and the symbols "A," "B," "N," and "D" of the page alphabet, respectively. Accordingly, using the page alphabet generated by the clickstream data analysis device 102, sequences of pages visited by a visitor during a browsing session may be represented as page symbol sequences. A page symbol sequence is a sequence of symbols corresponding, respectively, to a sequence of pages of the company website.

Figure 4B:
Figure 4C:
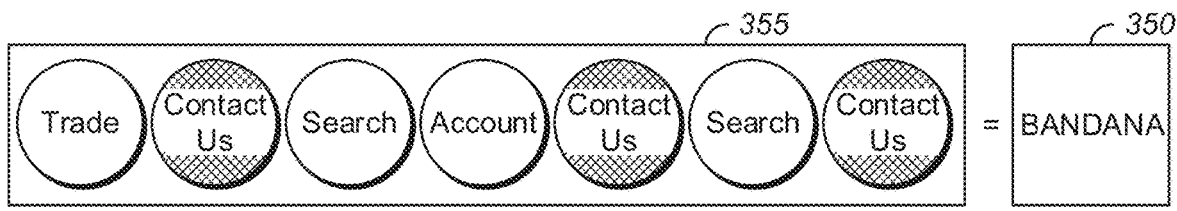
Figure 4D:
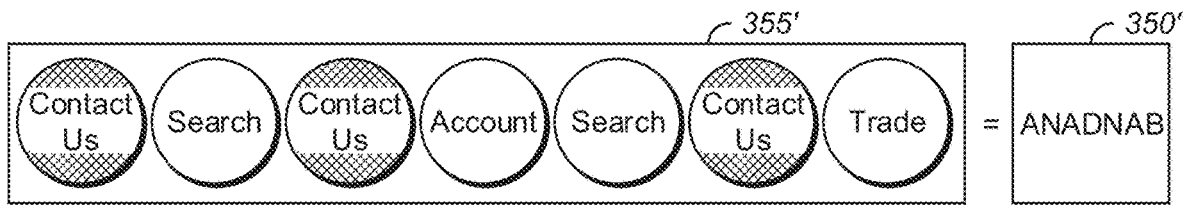

FIG. 4B illustrates examples of page symbol sequences. For example, FIG. 4B illustrates first through fifth page symbol sequences 310, 320, 330, 340, and 350 (i.e., A, BANANA, AND, A, BANDANA, respectively), each of which may correspond to a browsing session of a visitor of the company website. FIGS. 4C and 4D illustrate example relationships between sequences of pages and a corresponding page symbol sequences. As illustrated in FIG. 4C, a sequence of pages 355 including the "trade" page, the "contact us" page, the "search" page, the "account" page, the "contact us" page, the "search" page, and the "contact us page" corresponds to the fifth page symbol sequence 350 (BANDANA). As is illustrated in FIG. 4D, a sequence of pages 355', which is the reverse of the sequence of pages 355 illustrated in FIG. 4C, corresponds to the page symbol sequence 350' (ANANDNAB), which is the reverse of the fifth page symbol sequence 350.

Though, for the purpose of simplicity, the method of FIG. 3 is explained with reference to an example where the unique symbols of the page alphabet generated by the clickstream data analysis device 102 are letters of the English alphabet, unlike the symbols (i.e. letters) of the English alphabet, the symbols of a page alphabet generated by the clickstream data analysis device 102 are not limited in number to 26. For example, if an operator of the company website and/or the clickstream data analysis device 102 wishes to analyze traffic with respect to 160 pages of the company website, then the page alphabet generated by the clickstream data analysis device 102 will have at least 160 unique symbols. For example, the 160 unique symbols can be 160 unique integers.

Returning to FIG. 3, control may begin at 200, where the clickstream data analysis device 102 determines whether an alphabet has already been assigned to the website under analysis. If so, control transfers to 202; otherwise, control transfers to 205. At 202, the clickstream data analysis device 102 determines whether there have been any changes to the pages of the website since the assignment was performed. If so, control transfers to 205; otherwise, control continues at 210. Following 205, the clickstream data analysis device 102 proceeds to 210. In 210, the clickstream data analysis device 102 obtains the page symbol sequences of browsing sessions associated with the company website.

For example, in various implementations, the clickstream data analysis device 102 can observe the pages of the company website visited by the visitors of the website. For example, the clickstream data analysis device 102 may be connected to a server of the company website in such a manner that the clickstream data analysis device observes or receives requests (e.g., hypertext transfer protocol (HTTP) requests), from visitors of the website, to access pages of the company website. As another example, the functionality of the clickstream data analysis device 102 may be embodied by a server of the company website that receives the requests from the visitors to access pages of the company website. In various implementations, the clickstream data analysis device 102 can determine sequences of pages accessed by visitors during browsing sessions based on the above referenced requests, and the clickstream data analysis device can store indications of the sequences of pages as clickstream data in the clickstream database 106.

Thus, in 210, the clickstream data analysis device 102 can obtain page symbol sequences from the sequences of pages stored in the clickstream database 106. For example, as is discussed above with reference to FIG. 1 and FIGS. 4A-4D, the clickstream data analysis device 102 may use the page alphabet generated in 205 to generate page symbol sequences, such as the first through fifth page symbol sequences 310-350 of FIG. 4B, for sequences of pages included in the clickstream data stored in the clickstream database 106.

Figures 5A, 5B:
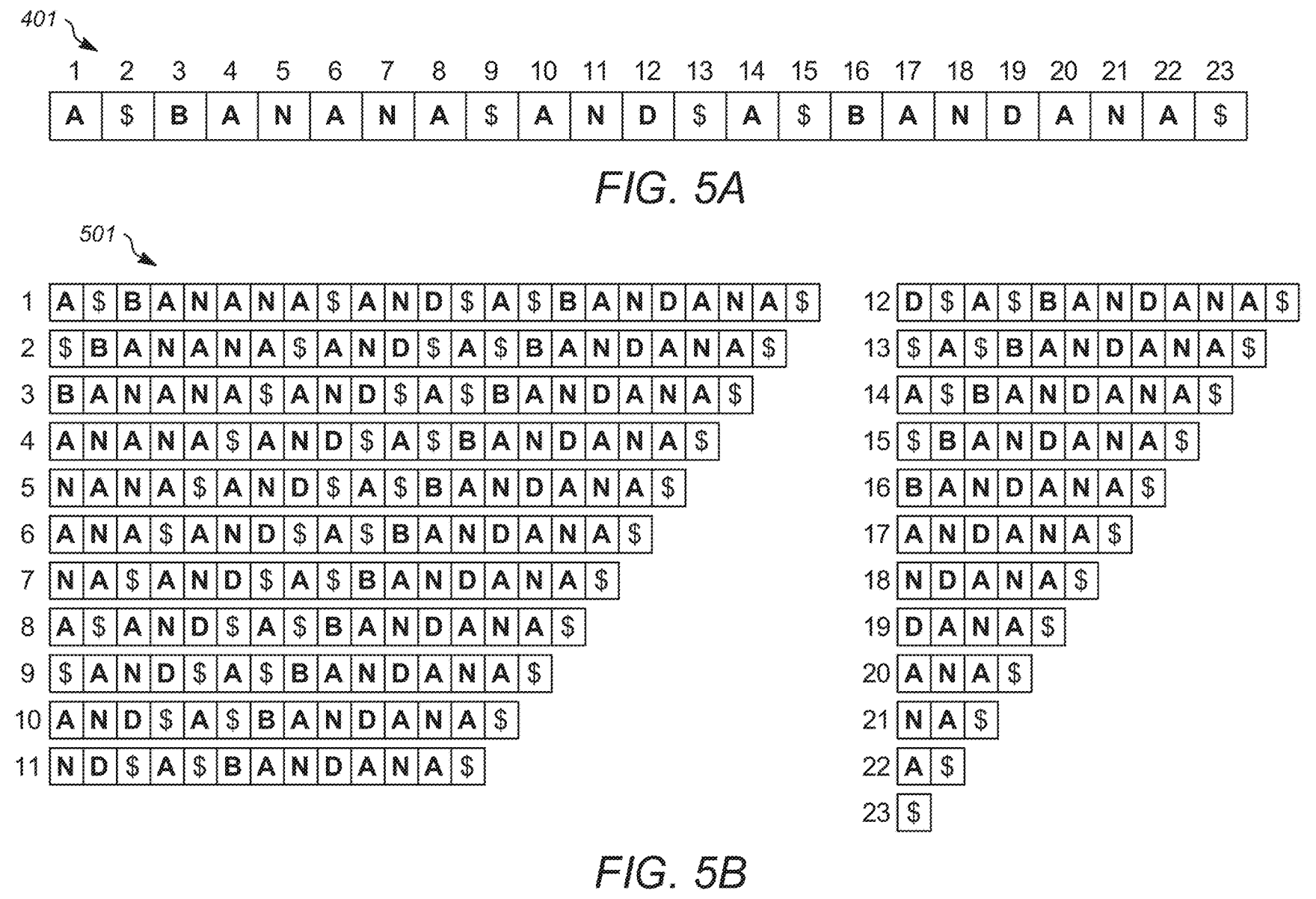

After 210, the clickstream data analysis device 102 may proceed to 215. In 215, the clickstream data analysis device 102 generates a master string including the page symbol sequences obtained in 210. In various implementations, the clickstream data analysis device 102 may generate the master string by concatenating the page symbol sequences obtained in 210 together with sentinel symbols such that at least one sentinel symbol exists between each consecutive pair of page symbol sequences in the master string. FIG. 5A illustrates an example of a master string according to principles of the present disclosure. FIG. 5A illustrates master string 401, which includes the first through fifth page symbol sequences 310-350 concatenated together in such a manner that a sentinel symbol "$" (i.e., dollar sign) exists between each of the first through fifth page symbol sequences 310-350. In various implementations, the master string may be generated by adding a sentinel symbol to the end of each of the page symbol sequences obtained in 210, and then concatenating each page symbol sequence (including the sentinel symbol added to the end) together. Depending on the application, the sentinel symbol that is used may be the same (i.e., dollar sign) or unique (i.e., the unique session id associated with each user session) across all sequences.

After 215, the clickstream data analysis device 102 may proceed to 220. In 220, the clickstream data analysis device 102 defines suffixes of the master string. For example, the clickstream data analysis device 102 defines the suffixes of the master string such that each suffix is a substring of the master string. For example, as is illustrated in FIG. 5A, each symbol in the master string 401 has a corresponding index (i.e., indexes 1-23), which may be assigned to a symbol by the clickstream data analysis device.

In various implementations, for each assigned index of each symbol of the master string, the clickstream data analysis device 102 may define a suffix corresponding to the assigned index such that the suffix corresponding to the index is a substring including the symbol of the master string to which the index is assigned, and the symbols of the master string to which any subsequent indexes, from among the assigned indexes, are assigned. For example, FIG. 5B illustrates example suffixes of a master string according to principles of the present disclosure. As is illustrated in FIG. 5B, for each of indexes 1-23 assigned to the symbols of the master string 401, suffixes 501 include a suffix corresponding to the index. Further, as is illustrated in FIG. 5B, for each of indexes 1-23, the suffix corresponding to the index includes the symbol of the master string 401 to which the index is assigned, and the symbols of the master string 401 to which any subsequent indexes are assigned. Accordingly, the suffix corresponding to index 1 includes the entire master string 401 because all of indexes 2-23 are subsequent to index 1. Further, the suffix corresponding to index 23 includes only the final symbol in the master string 401, because index 23 is the last index, and thus, there are no indexes subsequent to index 23. However, as is discussed in greater detail below with reference to FIG. 6, for each suffix among the suffixes defined in 220, the method illustrated in FIG. 3 essentially ignores the portion of the suffix beyond the first sentinel character (e.g., "$") in the suffix.

Figures 6, 7:
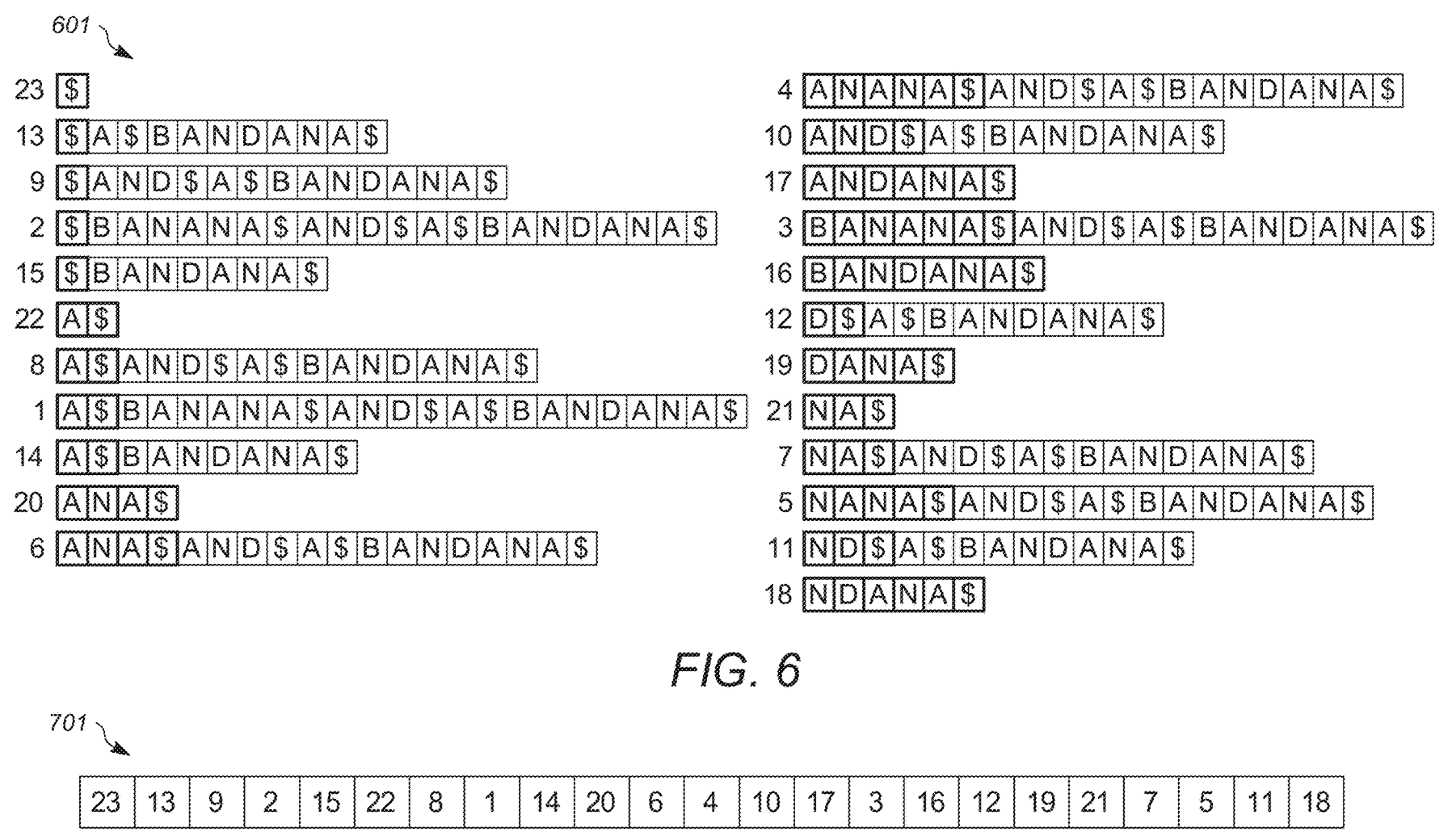

After 220, the clickstream data analysis device 102 may proceed to 225. In 225, the clickstream data analysis device 102 generates a suffix array corresponding to the master string. For example, in 225, the clickstream data analysis device 102 may arrange the suffixes defined in 220 lexicographically and generate, as the suffix array, an array storing indexes assigned to the symbols of the master string in the same order as the suffixes, from among the lexicographically arranged suffixes, that correspond to the assigned indexes, respectively. For example, FIG. 6 illustrates an example of lexicographically arranged suffixes of a master string according to principles of the present disclosure, and FIG. 7 illustrates an example of a suffix array of a master string according to principles of the present disclosure. Referring to FIG. 6, FIG. 6 illustrates lexicographically arranged suffixes 601. Lexicographically arranged suffixes 601 are suffixes 501 of FIG. 5B arranged in lexicographical order. As is discussed above with reference to 220, the method illustrated in FIG. 3 essentially ignores the portion of each suffix beyond the first sentinel character (e.g., "$") in the suffix. This is illustrated in FIG. 6 by the grayed out portion of each suffix following the first sentinel character in each suffix. Further, referring to FIG. 7, the suffix array 701 includes indexes 1-23 arranged in the same order as the lexicographically arranged suffixes 601 that correspond to the indexes 1-23.

After 225, the clickstream data analysis device 102 may proceed to 230. In 230, the clickstream data analysis device 102 generates a longest common prefix (LCP) array corresponding to the suffix array. For example, FIG. 8 illustrates an example of a longest common prefix (LCP) array according to principles of the present disclosure, LCP array 801. FIG. 8 also illustrates an example correspondence between the indexes of the master string 401 that are stored in the suffix array 701, LCP values stored in the LCP array 801, and the lexicographically arranged suffixes 601 of the master string 401. As is illustrated in the example shown in FIG. 8, in 230, the clickstream data analysis device may generate the LCP array 801 such that the LCP array 801 stores, for each consecutive pair of indexes from among the indexes stored in the suffix array 701, a corresponding LCP value. Further, for each consecutive pair of indexes from among the indexes stored in the suffix array 701, the corresponding LCP value may indicate a size of an LCP of the consecutive pair of suffixes, from among the lexicographically arranged suffixes 601, that correspond to the consecutive pair of indexes. In various implementations, the clickstream data analysis device 102 generates the LCP values of the LCP array 801 such that each LCP value is a total number of symbols included in the consecutive pair of suffixes that correspond to the consecutive pair of indexes to which the LCP value corresponds. For example, in the example illustrated in FIG. 8, the first consecutive pair of indexes in the suffix array 701 (i.e., index 23 and index 13) correspond to a consecutive pair of suffixes, from among lexicographically arranged suffixes 601 of the master string 401, whose LCP (i.e., "$") is one symbol long. Accordingly, the LCP value corresponding to the first consecutive pair of indexes (i.e., the first LCP value in the LCP array 801) is "1." The second through fourth consecutive pairs of indexes (i.e., indexes 13 and 9, 9 and 2, and 2 and 15) also each correspond to a consecutive pair of suffixes, from among lexicographically arranged suffixes 601 of the master string 401, whose LCP (i.e., "$") is one symbol long. Accordingly, the LCP values corresponding to the second, third and fourth consecutive pairs of indexes (i.e., the second, third and fourth LCP values in the LCP array 801) are also all "1."

As is also illustrated in FIG. 8, the fifth consecutive pair of indexes (i.e., the indexes 15 and 22) correspond to a consecutive pair of suffixes, from among the lexicographically arranged suffixes 601 of the master string 401, that have no LCP. Accordingly, the corresponding LCP value (i.e., the fifth LCP value in the LCP array 801) is "0." Further, the sixth consecutive pair of indexes (i.e., the indexes 22 and 8) correspond to a consecutive pair of suffixes, from among the lexicographically arranged suffixes 601 of the master string 401, that have an LCP (i.e., "As" that is two symbols long). Accordingly, the corresponding LCP value (i.e., the sixth LCP value in the LCP array 801) is "2."

After 230, the clickstream data analysis device 102 may proceed to 235. In 235, the clickstream data analysis device 102 determines one or more most common n-step subsequences based on the suffix array 701 and the LCP array 801, n being an integer greater than 1. The one or more most common n-step subsequences may be, for example, the most common subsequences of n pages of the company website from among the sequences of pages of the company website visited by visitors during browsing sessions corresponding to the visitors. For example, the clickstream data analysis device 102 may identify one or more consecutive runs of LCP values that are equal to or greater than n from among the LCP values of the LCP array 801.

In an example where n=2, there are three such runs in the LCP array 801 illustrated in FIG. 8: the 6th through 8th LCP values of the LCP array 801 (i.e., 2, 2 and 2); the 10th through 13th LCP values of the LCP array 801 (i.e., 4, 3, 2 and 3); and the 19th through 20th LCP values of the LCP array 801 (i.e., 3 and 2). In various implementations, only symbols of each suffix up to the first occurrence of the sentinel symbol (e.g., "$") are considered. Accordingly, in the example illustrated in FIG. 8, all symbols beyond the first sentinel symbol in each of the lexicographically arranged suffixes 601 are grayed-out.

In various implementations, after the clickstream data analysis device 102 identifies the one or more consecutive runs of LCP values of the LCP array 801 that are equal to or greater than n, the clickstream data analysis device 102 may determine a total number of LCP values included in each of the identified consecutive runs of LCP values. For example, the first identified consecutive run of LCP values (i.e., the 6th through 8th LCP values) includes a total of 3 LCP values; the second identified consecutive nut of LCP values (i.e., the 10th through 13th LCP values) includes a total of 4 LCP values; and the third identified consecutive nut of LCP values (i.e., the 19th through 20th LCP values) includes a total of 2 LCP values.

After determining the total number of LCP values included in each of the identified consecutive runs of LCP values, the clickstream data analysis device 102 may determine that the identified consecutive runs of LCP values having the x highest total number of LCP values are the one or more top consecutive runs of LCP values, where x is a positive integer. After identifying the one or more top consecutive runs of LCP values, the clickstream data analysis device 102 may identify, as the one or more most common n-step subsequences (i.e., the one or more most common subsequences of n pages of the company website from among the sequences of pages of the company website visited by visitors during browsing sessions corresponding to the visitors), one or more n-step subsequences corresponding, respectively, to the one or more top consecutive runs of LCP values. For example, for each of the top consecutive nut of LCP values, the n-step subsequence corresponding to the top consecutive run of LCP values may be the first n symbols held in common by the consecutive pairs of suffixes that correspond to the consecutive pairs of indexes to which the LCP values in the top consecutive nut of LCP values correspond.

As an example, the first identified consecutive run of LCP values (i.e., the 6th through 8th LCP values) correspond to 6th through 8th consecutive pairs of indexes of the suffix array 701 (i.e., indexes 22 and 8, and indexes 8 and 1, and indexes 1 and 14), and the consecutive pairs of suffixes, from among the lexicographically arranged suffixes 601, that correspond to the 6th through 8th consecutive pairs of indexes of the suffix array 701 each share symbols "A" and "$" in common. In various implementations, the sentinel symbol is discounted for the purpose of determining the most common n-step subsequence (i.e., the most common subsequence of n pages of the company website from among the sequences of pages of the company website visited by visitors during browsing sessions corresponding to the visitors). Thus, in various implementations, when n is two, the first identified consecutive run of LCP values would not be considered a consecutive run of LCP values of n (i.e., 2) or better.

As another example, the second identified consecutive run of LCP values (i.e., the 10th through 13th LCP values) correspond to 10th through 13th consecutive pairs of indexes of the suffix array 701, which correspond to the 10th through 13th consecutive pairs of suffixes from among the lexicographically arranged suffixes 601. Further, the 10th through 13th consecutive pairs of indexes of the lexicographically arranged suffixes 601 each share symbols "A" and "N" in common.

As another example, the third identified consecutive nm of LCP values (i.e., the 19th through 20th LCP values) correspond to 19th through 20th consecutive pairs of indexes of the suffix array 701, which correspond to the 19th through 20th consecutive pairs of suffixes from among the lexicographically arranged suffixes 601. Further, the 19th through 20th consecutive pairs of suffixes of the lexicographically arranged suffixes 601 each share symbols "N" and "A" in common.

Accordingly, with respect to the example illustrated in FIG. 8, the clickstream data analysis device 102 may identify the one most common 2-symbol subsequence to be [AN]=["contact us" page, "search" page]. Further, with respect to the example illustrated in FIG. 8, the clickstream data analysis device 102 may identify the two most common 2-symbol subsequences to be [AN]=["contact us" page, "search" page] and [NA]=["search" page, "contact us" page]. At 240, control displays the common n-step subsequences to a user, such as a website developer or user experience professional.

By using a suffix array (e.g., the suffix array 701), the clickstream data analysis device 102 may simply use the indexes of the suffix array 701 to reference the various suffixes of the master string 401. Accordingly, a number of copies of the suffixes of the master string 401 that need to be saved for various processing operations may be significantly reduced.

Further, while, for ease of description, the clickstream data analysis device 102 is discussed above with reference to an operation of identifying the most common 2-symbol subsequences in clickstream data, this is just one example of the of types of analysis that the clickstream data analysis device 102 may perform. For example, based on the string processing techniques discussed above with reference to FIGS. 3-8, the clickstream data analysis device 102 is capable of determining the numbers of multiple symbol subsequences of multiple lengths and generating visualizations of the symbol sub sequences as is discussed in greater detail below with reference to FIGS. 9 and 10.

Figure 10:
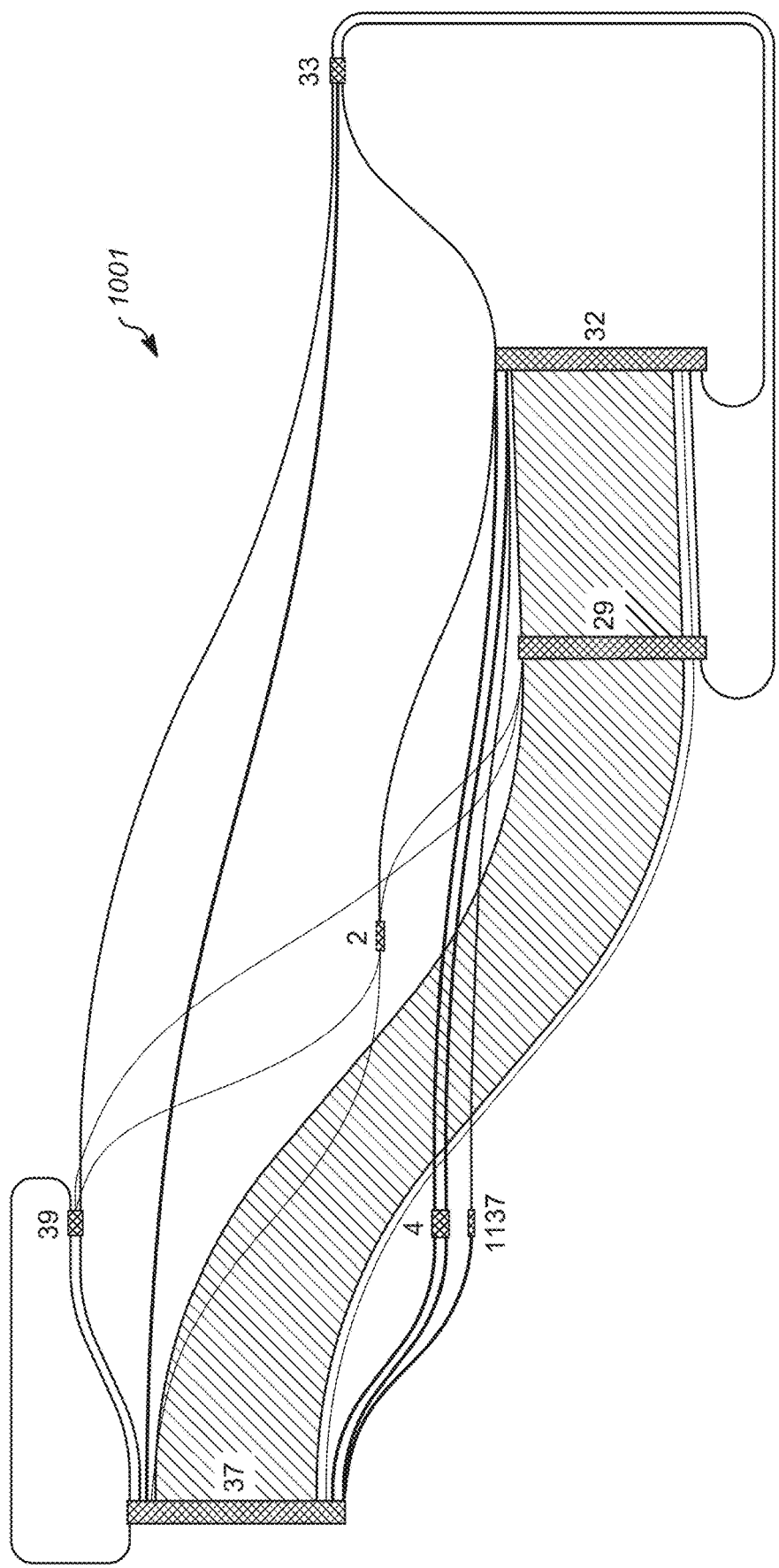
FIG. 10 illustrates an example of a clickstream data visualization.

FIG. 9 illustrates an example clickstream data visualization calibration interface 901. FIG. 10 illustrates an example of a clickstream data visualization 1001. Referring to FIG. 9, an operator of the company website and/or the clickstream data analysis device 102 may use the clickstream data visualization calibration interface 901 to select multiple parameters of a clickstream data visualization. These parameters include, for example:

Dataset—the dataset including the clickstream data that is to be visualized

Min Length—the minimum number of steps (i.e., pages or asserted clicks) of the subsequences that are to be visualized from the clickstream data under analysis.

Max Length—the maximum number of steps (i.e., pages or asserted clicks) of the subsequences that are to be visualized from the clickstream data under analysis.

First Step—a first page or asserted click in the subsequences that are to be visualized from the clickstream data under analysis.

Last Step—a first page or asserted click in the subsequences that are to be visualized from the clickstream data under analysis.

Min Complexity—a minimum number of unique pages or asserted clicks in the subsequences that are to be visualized from the clickstream data under analysis.

The Min Complexity visualization attribute may be used, for example, to minimize the impact of looping.

Hide Loops—an option to hide single page or multi-page cyclic loops or asserted clicks that point to their own origin pages (e.g., page refreshes, retracing past steps in a process, etc.).

Referring to FIG. 10, as is illustrated by the clickstream data visualization 1001, one type of visualization which may be generated by the clickstream data analysis device 102 is a New Sankey diagram. In the example illustrated in FIG. 10, the clickstream data visualization 1001 is a New Sankey diagram in which the first step parameter is set as page 37 and the last step parameter is set as page 32. As a New Sankey diagram, the clickstream data visualization 1001 is capable of revealing, at a glance, vast amounts of information about the types of subsequences that begin at page 37 and end at page 32, within the clickstream data under analysis. This information may include, but is not limited to, which subsequences occur most frequently and/or include loops. Depending on the context, loops may, or may not, be indicative of an issue that results in reducing the quality the browsing experience of a user of the company website. Thus, the ability to quickly identify loops, and to identify the pages and/or potential clicks associated with loops, may help an operator of the company website and/or the clickstream data analysis device 102 improve the company website more quickly.

Further, though the clickstream data visualization 1001 is illustrated in FIG. 10 as a New Sankey diagram, the clickstream data analysis device 102 is not limited to generating New Sankey-type visualizations. As one example, the clickstream data analysis device 102 may also generate a data visualizations in the form of a sunburst diagram.

Further, unlike techniques that rely on viewing clickstream data as a Markovian process, the string processing-based techniques used by the clickstream data analysis device 102 provide the ability to create a data visualization that visualizes actual full subsequences from the clickstream data under analysis (within the parameters defined in the clickstream data visualization calibration interface 901). For example, the data illustrated by the clickstream data visualization 1001 is not merely a string of probabilities determined based solely on the preceding page or asserted click (or the preceding n pages or asserted clicks where n is rarely large than 2 or 3) as is the case with some if not all conventional Markovian process-based clickstream data analysis techniques.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perk Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A method comprising:
assigning a first plurality of unique symbols to a plurality of potential interactions with a website, respectively;
determining whether a change to the website has been made since the first plurality of unique symbols were assigned;
in response to determining that a change to the website has been made, assigning a second plurality of unique symbols to a plurality of potential interactions with a website, respectively; and
obtaining a plurality of asserted interaction symbol sequences of a plurality of browsing sessions, respectively,
each of the browsing sessions corresponding to a visitor of the website, and
for each of the browsing sessions, the asserted interaction symbol sequence of the respective browsing session being a sequence of symbols, from among the second plurality of unique symbols, that corresponds, respectively, to a sequence of asserted interactions with the website visited during the respective browsing session by the corresponding visitor.

2. The method of claim 1 further comprising:
generating a master string including the plurality of asserted interaction symbol sequences; and
defining a plurality of suffixes of the master string.

3. The method of claim 2 wherein
each of the plurality of suffixes is a substring of the master string; and
the defining the plurality of suffixes includes,
assigning indexes to symbols included in the master string, respectively; and
for each of the assigned indexes, defining a suffix corresponding to the assigned index.

4. The method of claim 3 wherein, for each index, from among the assigned indexes, the suffix corresponding to the assigned index is a substring including:
the symbol of the master string to which the assigned index is assigned; and
the symbols of the master string to which any subsequent ones of the assigned indexes are assigned.

5. The method of claim 4, further comprising:
generating a suffix array, the generating the suffix array including,
arranging the plurality of suffixes lexicographically, and
generating, as the suffix array, an array storing the assigned indexes in a same order as the suffixes, from among the lexicographically arranged plurality of suffixes, that correspond to the assigned indexes, respectively.

6. The method of claim 5, further comprising:
generating a longest common prefix (LCP) array, the generating the LCP array including,
storing, for each consecutive pair of indexes from among the assigned indexes stored in the suffix array, a corresponding LCP value; and
for each of the consecutive pairs of indexes, the corresponding LCP value in the LCP array indicates a size of an LCP of the consecutive pair of suffixes, from among the lexicographically arranged plurality of suffixes, that correspond to the consecutive pair of indexes.

7. The method of claim 6 wherein each LCP value in the LCP array is a total number of symbols included in the consecutive pair of suffixes that correspond to the consecutive pair of indexes to which the LCP value corresponds.

8. The method of claim 7 further comprising:
based on the suffix array and the LCP array, determining one or more most common n-step subsequences of asserted interactions from among the sequences of asserted interactions with the website visited during the plurality of browsing sessions by the visitors to which the plurality of browsing sessions correspond, n being an integer greater than 1; and
displaying the most common n-step subsequences to a user.

9. The method of claim 8 wherein the determining of the one or more most common n-step subsequences of asserted interactions comprises:
identifying, from among the LCP values stored in the LCP array, one or more consecutive runs of the LCP values that are equal to or greater than n;
for each of the identified consecutive runs of the LCP values, determining a total number of the LCP values in the identified consecutive run of the LCP values;
determining, as one or more top consecutive runs of the LCP values, one or more of the consecutive runs of the LCP values, from among the identified consecutive runs of the LCP values, having the highest total numbers of the LCP values; and
identifying, as the one or more most common n-step subsequences, one or more n-step subsequences corresponding, respectively, to the one or more top consecutive runs of LCP values.

10. The method of claim 9 wherein, for each of the top consecutive runs of the LCP values, the n-step subsequence corresponding to the top consecutive run of the LCP values is a first n symbols held in common by the consecutive pairs of suffixes that correspond to the consecutive pairs of indexes to which the LCP values in the top consecutive run of LCP values correspond.

11. The method of claim 2 wherein the generating of the master string comprises:
concatenating the plurality of asserted interaction symbol sequences and a plurality of sentinel symbols together such that at least one of the sentinel symbols exists between each consecutive pair of the plurality of asserted interaction symbol sequences in the master string.

12. The method of claim 1 wherein, the browsing session corresponds to a beginning of a transmission control protocol session between the visitor of the website and a web server hosting the website and an ending of the transmission control protocol session between the visitor of the website and the web server hosting the website.

13. The method of claim 1 wherein, the browsing session corresponds to a first interaction between the visitor of the website and a last interaction between the visitor of the website prior to the expiration of a period of inactivity by the visitor.

14. A method comprising:
assigning a first plurality of unique symbols to a plurality of potential interactions with a website, respectively;
determining whether a change to the website has been made since the first plurality of unique symbols were assigned;
in response to determining that a change to the website has been made, assigning a second plurality of unique symbols to a plurality of potential interactions with a website, respectively; and
obtaining a plurality of asserted interaction symbol sequences of a plurality of browsing sessions, respectively, each of the browsing sessions corresponding to a visitor of the website and
for each of the browsing sessions, the asserted interaction symbol sequence of a respective one of the browsing sessions being a sequence of symbols, from among the second plurality of unique symbols, that corresponds, respectively, to a sequence of asserted interactions with the website visited during the respective browsing session by the corresponding visitor;
generating a master string including the plurality of asserted interaction symbol sequences;
generating a suffix array corresponding to the master string;
generating a longest common prefix (LCP) array corresponding to the suffix array;
based on the suffix array and the LCP array, determining one or more most common n-step subsequences of asserted interactions from among the sequences of asserted interactions with the website visited during the plurality of browsing sessions by the visitors to which the plurality of browsing sessions correspond, n being an integer greater than 1; and
displaying the most common n-step subsequences to a user.

15. The method of claim 14 wherein the generating of the master string comprises:
concatenating the plurality of asserted interaction symbol sequences and a plurality of sentinel symbols together such that at least one of the sentinel symbols exists between each consecutive pair of the plurality of asserted interaction symbol sequences in the master string.

16. The method of claim 14 further comprising:
defining a plurality of suffixes of the master string, each of the plurality of suffixes being a substring of the master string; and
the defining the plurality of suffixes includes,
assigning indexes to symbols included in the master string, respectively; and
for each of the assigned indexes, defining a suffix corresponding to the assigned index.

17. The method of claim 16 wherein, for each index, from among the assigned indexes, the suffix corresponding to the assigned index is a substring including:
the symbol of the master string to which the assigned index is assigned; and
the symbols of the master string to which any subsequent ones of the assigned indexes are assigned.

18. The method of claim 17, wherein generating the suffix array comprises:
arranging the plurality of suffixes; and
generating, as the suffix array, an array storing the assigned indexes in a same order as the suffixes, from among the arranged plurality of suffixes, that correspond to the assigned indexes, respectively.

19. The method of claim 18, wherein generating the LCP array comprises:
storing, for each consecutive pair of indexes from among the assigned indexes stored in the suffix array, a corresponding LCP value; and for each of the consecutive pairs of indexes, the corresponding LCP value in the LCP array indicates a size of an LCP of the consecutive pair of suffixes, from among the arranged plurality of suffixes, that correspond to the consecutive pair of indexes.

20. The method of claim 19 wherein each LCP value in the LCP array is a total number of symbols included in the consecutive pair of suffixes that correspond to the consecutive pair of indexes to which the LCP value corresponds.

* * * * *